US012679440B1

(12) United States Patent  (10) Patent No.: US 12,679,440 B1
Itani et al.  (45) Date of Patent: Jul. 14, 2026

(54) TWO-PIECE BUSHING FOR A COMMERCIAL VEHICLE

(71) Applicant: ZF Active Safety and Electronics US LLC, Livonia, MI (US)

(72) Inventors: Tamara Itani, West Lafayette, IN (US); Alex Schieler, Otterbein, IN (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 0 days.

(21) Appl. No.: 19/324,152

(22) Filed: Sep. 10, 2025

(51) Int. Cl.
  *B62D 1/16* (2006.01)
  *F16C 17/02* (2006.01)
  *F16C 43/02* (2006.01)

(52) U.S. Cl.
  CPC .............. *B62D 1/16* (2013.01); *F16C 17/022* (2013.01); *F16C 43/02* (2013.01); *F16C 2208/04* (2013.01); *F16C 2208/60* (2013.01); *F16C 2326/24* (2013.01)

(58) Field of Classification Search
  CPC .......... B62D 1/16; F16C 17/022; F16C 43/02; F16C 2326/24
  See application file for complete search history.

(56) References Cited

U.S. PATENT DOCUMENTS

| | | | |
|---|---|---|---|
| 4,422,348 A | * | 12/1983 | Campbell ............... F16H 51/00 |
| | | | 74/579 E |
| 4,895,391 A | * | 1/1990 | Groat ................... F16C 27/066 |
| | | | 280/779 |
| 4,909,638 A | * | 3/1990 | Muto .................... F16C 33/046 |
| | | | 384/295 |
| 5,391,113 A | * | 2/1995 | Tanaka .................... B21K 1/12 |
| | | | 74/492 |
| 7,712,783 B2 | * | 5/2010 | Hoffman .................. B62D 1/16 |
| | | | 280/779 |
| 8,337,087 B2 | * | 12/2012 | Blachon .............. F16C 11/0614 |
| | | | 384/208 |

(Continued)

FOREIGN PATENT DOCUMENTS

| | | |
|---|---|---|
| BR | MU8700326 Y1 | 11/2008 |
| CA | 2461634 A1 | 9/2005 |

(Continued)

*Primary Examiner* — Jason D Shanske
*Assistant Examiner* — Joselynn Y Sliteris
(74) *Attorney, Agent, or Firm* — LEYDIG, VOIT & MAYER, LTD.

(57) ABSTRACT

A steering assembly for a vehicle, includes a housing mounted to a firewall. The housing defines a first through hole. A top cap defines a second through hole mounted on the housing. The top cap and housing define a chamber. A portion of the steering shaft within the through holes includes an upper groove and an axially spaced lower groove each circumferentially surrounding the shaft. A bearing is disposed in the chamber and circumferentially surrounding the steering shaft. The bearing has an upper lip that engages with the upper groove, and a lower lip that engages with the lower groove. A convex outer surface of the steering shaft abuts an inner wall of the chamber, and an inner convex surface abuts the intermediate shaft. The bearing limits an axial movement of the steering shaft during operation of the vehicle and to permit rotation of the steering shaft.

18 Claims, 3 Drawing Sheets

(56)                    References Cited

U.S. PATENT DOCUMENTS

| | | | | |
|---|---|---|---|---|
| 8,523,444 | B2 * | 9/2013 | Melet | F04D 29/057 |
| | | | | 384/100 |
| 8,939,646 | B2 * | 1/2015 | Forrest | F16J 15/184 |
| | | | | 384/295 |
| 10,731,625 | B1 * | 8/2020 | Harshman | F03C 1/0671 |
| 11,703,086 | B2 * | 7/2023 | Dupuis | F16C 33/08 |
| | | | | 384/276 |
| 11,866,105 | B2 * | 1/2024 | Schubert | B62D 5/0448 |
| 2002/0157494 | A1 * | 10/2002 | Matsumoto | B62D 1/192 |
| | | | | 74/492 |
| 2004/0208407 | A1 | 10/2004 | Wenz | |
| 2004/0222623 | A1 * | 11/2004 | Walters | F16J 15/3252 |
| | | | | 280/779 |

FOREIGN PATENT DOCUMENTS

| | | | |
|---|---|---|---|
| DE | 1625561 | A1 | 8/1970 |
| DE | 2164435 | A1 | 8/1973 |

* cited by examiner

100

102

104

Firewall Housing

TWO-PIECE BUSHING FOR A COMMERCIAL VEHICLE

FIELD

The present disclosure pertains to the field of steering systems for commercial vehicles, in particular a bushing for a steering column of the commercial vehicle.

BACKGROUND

Conventional designs for rotational components typically employ regular ball bearings secured in place using two snap rings. While functionally adequate, this configuration is resource intensive due because of the additional securing hardware required.

Alternative solutions include round plastic self-lubricating bushings used in conjunction with snap rings. However, such bushings, when used in conjunction with snap rings, are unable to rotate freely, as the snap rings restrict movement. Conversely, if the snap rings are removed, the bushings fail to remain in a fixed axial position within the housing, leading to undesirable shifting during operation.

Additionally, most bushings currently on the market are primarily designed for locking into a fixed structure, rather than facilitating free rotational movement. These designs prioritize axial retention over rotational functionality, thereby limiting their applicability in vehicular systems where both secure positioning and smooth rotation are required.

SUMMARY

A first aspect of the present disclosure provides a steering assembly for a vehicle. The steering assembly comprises a housing configured to be mounted to a chassis of the vehicle, at a firewall between a driver cab and an engine bay of the vehicle, wherein the housing defines a first through hole connecting the driver cab and the engine bay. A top cap defines a second through hole mounted on the housing on a side facing away from the firewall, the top cap and housing defining a chamber therebetween. A steering shaft is disposed in the first and second through holes, having a first end mechanically coupled to an upper steering shaft, and a second end mechanically coupled to a lower steering shaft. A portion of the steering shaft within the first and second through holes includes an upper groove and an axially spaced lower groove each circumferentially surrounding the shaft. An annular two-piece bearing disposed in the chamber and circumferentially surrounding the steering shaft. The annular two-piece bearing has an upper lip engaging with the upper groove, and a lower lip engaging with the lower groove, a convex outer surface abutting an inner wall of the chamber, and an inner convex surface that abuts the steering shaft. The annular two-piece bearing is configured to limit an axial movement of the steering shaft during operation of the vehicle and to permit rotation of the steering shaft.

According to an implementation of the first aspect, the annular two-piece bearing is composed of a combination of nylon and glass fibers.

According to an implementation of the first aspect, the steering shaft has a surface diameter, wherein the upper groove and the lower groove have a groove diameter, and wherein the groove diameter is less than the surface diameter.

According to an implementation of the first aspect, the annular two-piece bearing has an inner diameter based on the upper lip and the lower lip, and wherein the inner diameter of the annular two-piece bearing is less than the surface diameter.

According to an implementation of the first aspect, the inner diameter of the annular two-piece bearing is same as the groove diameter.

According to an implementation of the first aspect, the upper lip of the annular two-piece bearing interacts with the upper groove of the steering shaft and the lower lip of the annular two-piece bearing interacts with the lower groove of the steering shaft.

According to an implementation of the first aspect, each piece of the annular two-piece bearing includes a male snapping member and a female snapping member, and wherein a male snapping member of a first piece of the annular two-piece bearing mechanically interacts with a female snapping member of a second piece of the annular two-piece bearing.

According to an implementation of the first aspect, a female snapping member of the first piece of the annular two-piece bearing mechanically interacts with a male snapping member of the second piece of the annular two-piece bearing.

According to an implementation of the first aspect, a first radius of curvature of the outer convex surface of the annular two-piece bearing is designed based on a second radius of curvature of the inner wall of the chamber.

A second aspect of the present disclosure provides a method for installing a steering assembly for a vehicle. The method includes providing a housing configured to be mounted to a chassis of the vehicle, at a firewall between a driver cab and an engine bay of the vehicle, wherein the housing defines a first through hole connecting the driver cab and the engine bay, providing a top cap defining a second through hole mounted on the housing on a side facing away from the firewall, the top cap and housing defining a chamber therebetween, providing a steering shaft disposed in the first and second through holes, having a first end mechanically coupled to an upper steering shaft, and a second end mechanically coupled to a lower steering shaft, wherein a portion of the steering shaft within the first and second through holes includes an upper groove and an axially spaced lower groove each circumferentially surrounding the shaft. The method also includes providing an annular two-piece bearing disposed in the chamber and circumferentially surrounding the steering shaft, the annular two-piece bearing having an upper lip engaging with the upper groove, and a lower lip engaging with the lower groove, a convex outer surface abutting an inner wall of the chamber, and an inner convex surface that abuts the steering shaft, where the annular two-piece bearing is configured to limit an axial movement of the steering shaft during operation of the vehicle and to permit rotation of the steering shaft.

According to an implementation of the second aspect, the annular two-piece bearing is composed of a combination of nylon and glass fibers.

According to an implementation of the second aspect, the steering shaft has a surface diameter, wherein the upper groove and the lower groove have a groove diameter, and wherein the groove diameter is less than the surface diameter.

According to an implementation of the second aspect, the annular two-piece bearing has an inner diameter based on the upper lip and the lower lip, and wherein the inner diameter of the annular two-piece bearing is less than the surface diameter.

According to an implementation of the second aspect, the inner diameter of the annular two-piece bearing is same as the groove diameter.

According to an implementation of the second aspect, the upper lip of the annular two-piece bearing interacts with the upper groove of the steering shaft and the lower lip of the annular two-piece bearing interacts with the lower groove of the steering shaft.

According to an implementation of the second aspect, each piece of the annular two-piece bearing includes a male snapping member and a female snapping member, and wherein a male snapping member of a first piece of the annular two-piece bearing mechanically interacts with a female snapping member of a second piece of the annular two-piece bearing.

According to an implementation of the second aspect, a female snapping member of the first piece of the annular two-piece bearing mechanically interacts with a male snapping member of the second piece of the annular two-piece bearing.

According to an implementation of the second aspect, a first radius of curvature of the outer convex surface of the annular two-piece bearing is designed based on a second radius of curvature of the inner wall of the chamber.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
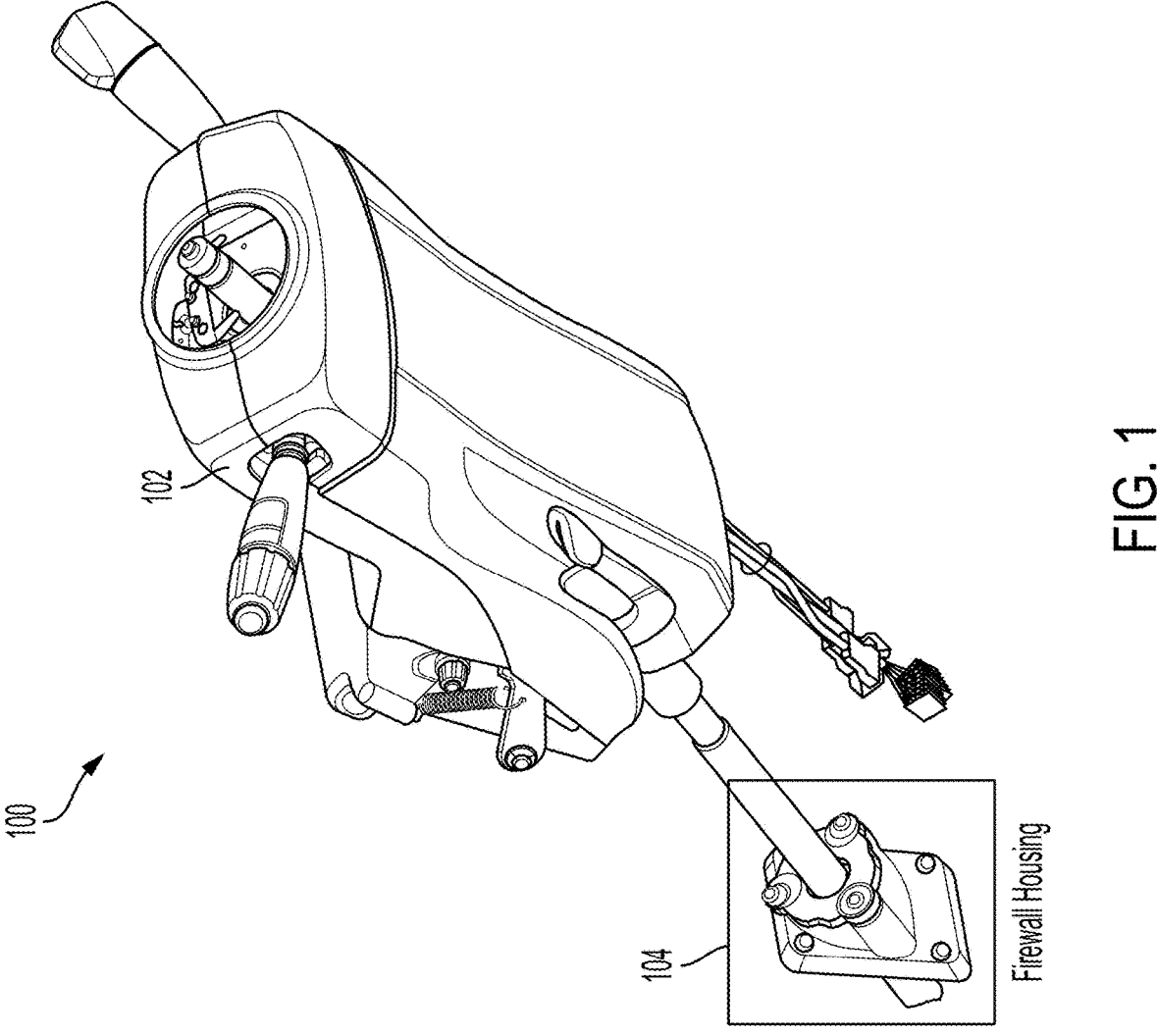
FIG. 1 illustrates a perspective view of a portion of an exemplary steering column of a vehicle, according to one or more examples of the present disclosure.

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

A steering column of a vehicle is usually composed of three parts, an upper steering shaft, an intermediate shaft, and a lower steering shaft. The upper steering shaft includes an input shaft that connects to a steering wheel of the vehicle to receive a rotation command from a driver of the vehicle. The upper steering shaft may also include mechanisms that facilitate a tilt or telescopic operation of the steering wheel based on the needs of a driver of the vehicle. The lower end of the upper steering shaft is mechanically coupled to an intermediate shaft. The lower end of the intermediate shaft may be mechanically coupled to the lower steering shaft. The intermediate steering shaft transmits the rotation received at the upper steering shaft to the lower steering shaft. The lower intermediate shaft may include steering gears that are configured to perform steering operation of the vehicle.

During operation of the vehicle, the intermediate shaft of the steering column may experience large amounts of undesirable axial force that may cause the intermediate shaft to slide along its length. This motion of the axial force causes unwanted wear and tear of the intermediate shaft. For smooth operation of the intermediate shaft, a bushing is mechanically coupled to the intermediate shaft of the steering column to limit the axial motion of the intermediate shaft, while allowing for smooth rotation of the intermediate shaft as it transmits rotation from the upper steering shaft to the lower steering shaft.

Conventional bushings are often composed of regular ball bearings with two snap rings. However, the snap rings may prevent the ball bearings from rotating, and without the snap rings, the ball bearings would not rotate in a fixed position, thereby allowing unwanted axial motion of the intermediate shaft. Conventional bushings are also used to lock into something, and none of them are made to spin on a shaft.

Embodiments of the present disclosure provide a self-lubricating bushing that is configured to be disposed in grooves that are provided on the intermediate shaft. In some embodiments, the bushing may include two-pieces that are assembled together around the intermediate shaft. The bushing is designed using self-lubricating material that not only reduces axial motion of the intermediate shaft but also allows for smooth rotation of the intermediate shaft as it transmits rotation received at the upper steering shaft to the lower steering shaft for steering of the vehicle.

FIG. 1 illustrates a perspective view of a portion of an exemplary steering column of a vehicle, according to one or more examples of the present disclosure. FIG. 1 illustrates a portion of a steering column 100 that includes an upper steering shaft 102 and an intermediate shaft 106. As shown in FIG. 1, an upper end of the intermediate shaft 106 is mechanically coupled to a lower end of the upper steering shaft 102. A lower end of the intermediate shaft 106 may be mechanically coupled to a lower steering shaft. An input from a driver of the vehicle is received at the upper steering shaft 102 and transmitted to the lower steering shaft via the intermediate shaft 104. In some embodiments, the upper steering shaft 102 may be disposed within a driver cab of a vehicle. Additionally, a portion of the intermediate shaft 106 may be disposed within the driver cab of the vehicle. The engine bay of the vehicle may include the lower steering shaft that is responsible for performing the steering operation of the vehicle. In order for optimal operation of the engine of the vehicle, the driver cab is separated from the engine bay of the vehicle using a firewall 104.

The firewall 104 in a vehicle serves as a safety and comfort feature by providing both fire protection and insulation from sound and heat. In the event of an engine fire, the firewall housing acts as a barrier, helping to prevent flames and hazardous fumes from reaching the passenger compartment. The firewall 104 is typically constructed from fire-resistant materials like steel or specially treated composites that can withstand high temperatures. In addition to fire safety, the firewall 104 also insulates the cabin from the noise, vibrations, and heat generated by the engine. The firewall 104 is often lined with sound-deadening and thermal insulation materials, which reduce engine roar and help maintain a comfortable interior temperature. This dual function enhances both the safety and driving experience of the vehicle.

A housing is designed within the firewall 104 that allows the intermediate shaft 106 to connect the upper steering shaft 102 disposed in the driver cab of the vehicle to the lower steering system located in the engine bay of the vehicle. As shown in FIG. 1, a portion of the intermediate shaft 106 is disposed within the housing designed within the firewall 104. The structure of the housing within the firewall is described in more detail with respect to FIG. 2.

Figure 2:
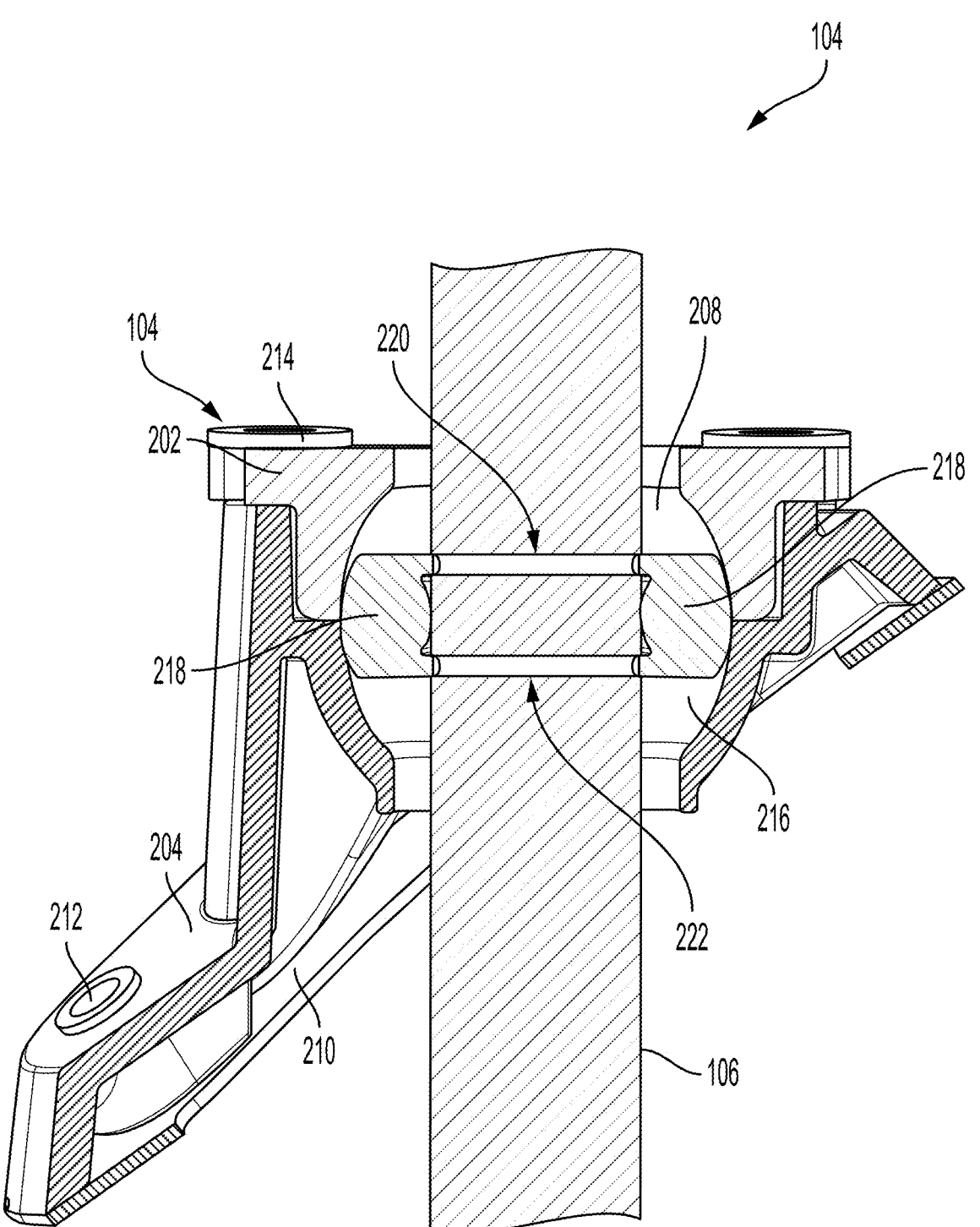
FIG. 2 illustrates a cross-sectional view of a portion of a steering shaft of the steering column of the commercial vehicle, according to one or more embodiments of the present disclosure.

FIG. 2 illustrates a cross-sectional view of a portion of a steering shaft of the steering column of the commercial vehicle, according to one or more embodiments of the present disclosure. Cross-sectional view 200 of FIG. 2 illustrates a portion of the intermediate shaft 106 that is disposed within the housing 204 of the firewall 104. The housing 204 of the firewall 104 is mechanically coupled to a chassis 210 of the vehicle using fastening means 212. The housing 204 defines a first through hole 216. A top cap 202 is mechanically coupled to the housing 204 using fastening means 214 on a side facing away from the firewall 104. In some embodiments, the fastening means 212 and 214 may be one or more of a fastener, screw, bolts or any other similar fastening means that couples the housing 204 to the chassis 210 and also mechanically couples the top cap 202 to the housing 204.

The top cap 202 defines a second through hole 208. The first through hole 216 and the second through hole 208 together form a chamber. A portion of the intermediate shaft 106 is disposed through the first through hole 216, the second through hole 208, and the chamber formed by the first through hole 216 and the second through hole 208. As discussed with respect to FIG. 1, the intermediate shaft 106 is configured to connect the upper steering shaft 102 to the lower steering shaft and transmit the rotation received at the upper steering shaft 102 to the lower steering shaft.

While the intermediate shaft 106 is configured to rotate to transmit the rotation from the upper steering shaft 102 to the lower steering shaft, the intermediate shaft 106 may also be susceptible to forces that cause the intermediate shaft 106 to move in an axial manner during operation. In order to reduce the undesirable axial motion of the intermediate shaft 106, a two-piece bearing 218 is disposed around the portion of the steering shaft in the chamber created by the first through hole 216 of the housing 204 and the second through hole 208 of the top cap 202.

In some embodiments, the intermediate shaft 106 includes a plurality of grooves that circumferentially surround the intermediate shaft 106 and are configured to receive the two-piece bearing 218. For example, the intermediate shaft 106 includes a first groove 220 (e.g., an upper groove), and a second groove 222 (e.g., a lower groove), where the second groove 222 is axially spaced from the first groove 220. In some embodiments, an outer surface of the first groove 220 and the second groove 222 may have a groove radius that is lower than the shaft radius of the outer surface intermediate shaft 106.

An inner surface of the two-piece bearing 218 may be designed to have a lower radius than an outer surface, so that the annular bearing 218 may form a secure fit around the intermediate shaft 106. For example, an upper lip and a lower lip that form the inner surface of the two-piece bearing 218 have the same diameter as a groove diameter of the first groove 220 and the second groove 222 of the intermediate shaft 106. In some embodiments, the upper lip engages with the first groove 220 of the intermediate shaft 106, and the lower lip engages with the second groove 222 of the intermediate shaft 106, respectively, to form a secure fit.

In some embodiments, the two-piece bearing may be installed on the intermediate shaft 106 by bring the two pieces of the two-piece bearing together around the intermediate shaft 106. Each piece of the two-piece bearing includes a male snapping member and a female snapping member. For example, a male snapping member of a first piece of the two-piece bearing is mechanically engaged with a female snapping member of a second piece of the two-bearing. Similarly, a male snapping member of the second piece of the two-piece bearing is mechanically engaged with a female snapping member of the first piece of the two-bearing. This forms a secure connection between the two pieces of the two-piece bearing. As described previously, each of the first piece and the second piece include an upper lip that engages with the first groove 220 of the intermediate shaft 106, and a lower lip that engages with the second groove 222 of the intermediate shaft 106, respectively.

The two-piece bearing 218 may also include a convex outer surface that abuts against the walls of the chamber created by the first through hole 216 of the housing 204 and the second through hole 208 of the top cap 202. In some embodiments, a curvature of the outer surface of the two-piece bearing 218 may be designed in a way to match the curvature of the chamber created by the first through hole 216 of the housing 204 and the second through hole 208 of the top cap 202. The convex outer surface along with the first snapping mechanism and the second snapping mechanism of the two-piece bearing 218 may be configured to reduce the axial motion of the intermediate shaft 106.

In some embodiments, the two-piece bearing 218 may also include a convex inner surface that abuts the intermediate shaft 106. The convex inner surface allows for the intermediate shaft 106 to rotate freely as it transmits steering commands received at the upper steering shaft 102 to the lower steering shaft.

Figure 3A:
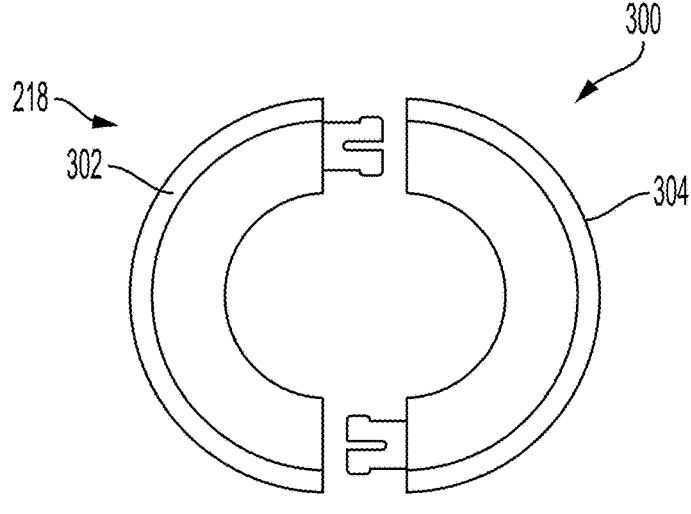
FIGS. 3A-3C illustrate different views of a two-piece bearing, according to one or more embodiments of the present disclosure.
Figure 3B:
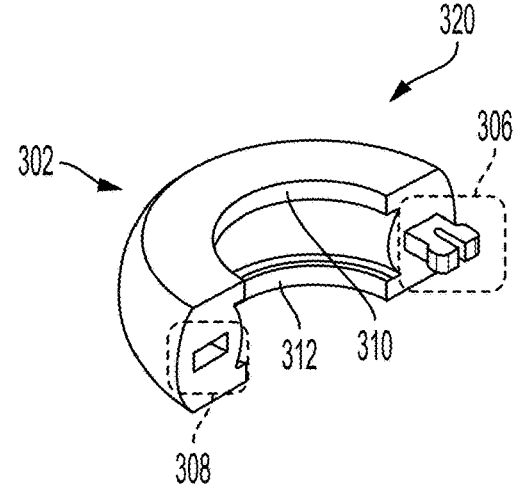
Figure 3C:
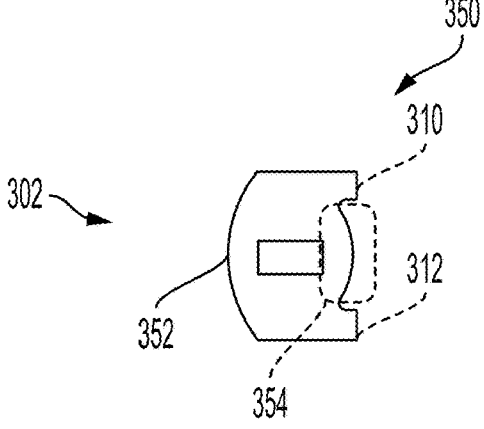

FIGS. 3A-3C illustrate different views of a two-piece bearing, according to one or more embodiments of the present disclosure.

FIG. 3A provides a top-down view of the two-piece bearing 218. Top-down view 300 of FIG. 3A depicts two pieces of the two-piece bearing 218. The two-piece bearing 208 includes a first piece 302 and a second piece 304. Each of the first piece 302 and the second piece 304 may include a male snapping member and a female snapping member. The male and female snapping members are mechanical components designed to mechanically couple the first piece 302 and the second piece 304 of the two-piece bearing 218 using a snap-fit mechanism.

FIG. 3B provides a perspective view of a first piece of the two-piece bearing 218. Perspective view 320 depicts the first piece 302 of the two-piece bearing 218. As shown in FIG. 3B, the first piece 302 includes a male snapping member 306 and a female snapping member 308.

Based on the design of the first piece 302, the second piece 304 also includes a corresponding female snapping member and a corresponding male snapping member. For example, the male snapping member 306 of the first piece 302 may be a protruding or inserting component. The protruding or inserting component may be shaped like a cantilever hook, barb, or a tab. The female snapping member 308 may be a receiving component to receive the male snapping member 306. For example, the female snapping number may be shaped as a slot, hole, groove, or cavity.

For example, the male snapping member 306 of the first piece 302 may mechanically interact with a corresponding female snapping member of the second piece 304 of the two-piece bearing 218. The male snapping member 306 may be inserted within a female snapping member of the second piece 304. As the male snapping member 306 of the first piece 302 is inserted within the female snapping member of the second piece 304, the male snapping member 306 of the first piece 302 may partially deform so that the male snapping member 306 of the first piece 302 in order to be inserted within opening of the female snapping member of the second piece 304. In some embodiments, the male snapping member 306 of the first piece 302 may be depressed or squeezed as the male snapping member 306 of the first piece 302 may be inserted within the cavity of the female snapping member of the second piece 304. Once the male snapping member 306 is inserted within the female snapping member, the male snapping member 306 may return to a rest or undeformed state.

The female snapping member of the second piece 304 may be configured to guide the male snapping member 306 of the first piece 302 in the female snapping member of the second piece 304 and capture the male snapping member 306, once the male snapping member 306 is fully inserted within the female snapping member of the second piece 304. The female snapping member of the second piece 304 may be configured to hold the male snapping member 306 of the first piece 302 in place based on interference and mechanical locking.

The first piece 302 also includes a female snapping member 308 that may mechanically interact with a male snapping member of the second piece 304 of the second piece. The female snapping member 308 of the first piece 302 and the male snapping member of the second piece 304 may interact in the way designed above. Together, the male and female snapping members on the first piece 302 and second piece 304 may be mechanically coupled together to create the two-piece bearing 218.

Each of the first piece 302 and the second piece 304 of the two-piece bearing 218 include an inner surface. An inner diameter of the inner surface of the two-piece bearing 218 is measured based on an upper lip 310 and a lower lip 312. In order to hold the two-piece bearing 218 in an axially stationary position with respect to the intermediate shaft 106, the inner diameter of the upper lip 310 and the lower lip 312 is less than the surface diameter of the intermediate shaft 106. The two-piece bearing 218 may be disposed around the intermediate shaft 106 by bringing the first piece 302 and the second piece 304 together such that the male snapping member 306 of the first piece 302 mechanically interacts with a female member of the second piece 304, and the female snapping member 308 of the first piece 302 mechanically interacts with a male member of the second piece 304. Because the inner diameter of the upper lip 310 and lower lip 312 of the inner surface is less than the surface diameter of the intermediate shaft 106, the upper lip 310 and the lower lip 312 are configured to mechanically interact with the first groove 220 and the second groove 222 of the intermediate shaft respectively, in order to hold the two-piece bearing 218 in in an axially stationary manner with respect to the intermediate shaft 106.

FIG. 3C provides a cross-section view of the two-piece bearing 218. Cross-section view 350 illustrates a convex outer surface 352 of the two-piece bearing 218. The outer surface 352 of the two-piece bearing 218 is configured to abut a wall of a chamber created by the first through hole 216 of the housing 204 and the second through hole 208 of the top cap 202, as discussed with respect to FIG. 2. In some embodiments, the outer surface 352 of the two-piece bearing 218 has a convex curvature that helps in aligning the annular bearing 218 along the walls of the chamber. A radius of curvature of the convex curvature of the outer surface 352 may be designed based on the radius of curvature of the walls of the chamber. In some embodiments, the two-piece bearing 218 is composed of a compound of nylon and glass fibers. For example, the annular bearing 218 may be composed of a compound that has nylon with approximately 30% glass fibers.

Cross-section view 350 of the first piece 302 of the two-piece bearing 218 also illustrates the upper lip 310 and the lower lip 312. The inner diameter of the annular two-piece bearing 218 is delineated based on the upper lip 310 and the lower lip 312. In some embodiments, the inner diameter of the two-piece bearing 218 is less than the surface diameter of the intermediate shaft 106. As discussed with respect to FIG. 2, the two-piece bearing may be installed on the intermediate shaft 106 by bringing the two pieces of the two-piece bearing together around the intermediate shaft 106. Each piece of the two-piece bearing includes a male snapping member and a female snapping member. For example, a male snapping member of a first piece of the two-piece bearing is mechanically engaged with a female snapping member of a second piece of the two-bearing. Similarly, a male snapping member of the second piece of the two-piece bearing is mechanically engaged with a female snapping member of the first piece of the two-bearing. This forms a secure connection between the two pieces of the two-piece bearing.

As described with respect to FIG. 2, each of the first piece 302 and the second piece 304 of the two-piece bearing 218 includes a upper lip 310 that engages with the first groove 220 of the intermediate shaft 106, and a lower lip 312 that engages with the second groove 222 of the intermediate shaft 106, respectively, in order to hold the two-piece bearing 218 in an axially stationary manner with respect to the intermediate shaft 106. For example, the upper lip 310 and lower lip 312 of the inner surface of the two-piece bearing 218 has the same diameter as a groove diameter of the first groove 220 and the second groove 222 of the intermediate shaft 106.

Cross-section view 350 also illustrates a convex inner surface 354 that abuts the outer surface of the intermediate shaft 106. The convex inner surface 354 is configured to facilitate the free rotation of the intermediate shaft 106 based on the steering input received at the upper steering shaft 102.

While the subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A steering assembly for a vehicle, comprising:
a housing configured to be mounted to a chassis of the vehicle, at a firewall between a driver cab and an engine bay of the vehicle, wherein the housing defines a first through hole connecting the driver cab and the engine bay;
a top cap defining a second through hole mounted on the housing on a side facing away from the firewall, the top cap and housing defining a chamber therebetween;
a steering shaft disposed in the first and second through holes, having a first end mechanically coupled to an upper steering shaft, and a second end mechanically coupled to a lower steering shaft,
wherein a portion of the steering shaft within the first and second through holes includes an upper groove and an axially spaced lower groove each circumferentially surrounding the steering shaft; and
an annular two-piece bearing disposed in the chamber and circumferentially surrounding the steering shaft, the annular two-piece bearing having:
an upper lip engaging with the upper groove, and a lower lip engaging with the lower groove;
a convex outer surface abutting an inner wall of the chamber;
an inner convex surface that abuts the steering shaft,
wherein the annular two-piece bearing is configured to limit an axial movement of the steering shaft during operation of the vehicle and to permit rotation of the steering shaft.

2. The steering assembly of claim 1, wherein the annular two-piece bearing is composed of a combination of nylon and glass fibers.

3. The steering assembly of claim 1, wherein the steering shaft has a surface diameter, wherein the upper groove and the lower groove have a groove diameter, and wherein the groove diameter is less than the surface diameter.

4. The steering assembly of claim 3, wherein the annular two-piece bearing has an inner diameter based on the upper lip and the lower lip, and wherein the inner diameter of the annular two-piece bearing is less than the surface diameter.

5. The steering assembly of claim 4, wherein the inner diameter of the annular two-piece bearing is the same as the groove diameter.

6. The steering assembly of claim 4, wherein the upper lip of the annular two-piece bearing interacts with the upper groove of the steering shaft and the lower lip of the annular two-piece bearing interacts with the lower groove of the steering shaft.

7. The steering assembly of claim 1, wherein each piece of the annular two-piece bearing includes a male snapping member and a female snapping member, and wherein a male snapping member of a first piece of the annular two-piece bearing mechanically interacts with a female snapping member of a second piece of the annular two-piece bearing.

8. The steering assembly of claim 7, wherein a female snapping member of the first piece of the annular two-piece bearing mechanically interacts with a male snapping member of the second piece of the annular two-piece bearing.

9. The steering assembly of claim 1, wherein a first radius of curvature of the convex outer surface of the annular two-piece bearing is designed based on a second radius of curvature of the inner wall of the chamber.

10. A method for installing a steering assembly for a vehicle, comprising:
providing a housing configured to be mounted to a chassis of the vehicle, at a firewall between a driver cab and an engine bay of the vehicle, wherein the housing defines a first through hole connecting the driver cab and the engine bay;
providing a top cap defining a second through hole mounted on the housing on a side facing away from the firewall, the top cap and housing defining a chamber therebetween;
providing a steering shaft disposed in the first and second through holes, having a first end mechanically coupled to an upper steering shaft, and a second end mechanically coupled to a lower steering shaft,
wherein a portion of the steering shaft within the first and second through holes includes an upper groove and an axially spaced lower groove each circumferentially surrounding the steering shaft; and
providing an annular two-piece bearing disposed in the chamber and circumferentially surrounding the steering shaft, the annular two-piece bearing having:
an upper lip engaging with the upper groove, and a lower lip engaging with the lower groove;
a convex outer surface abutting an inner wall of the chamber;
an inner convex surface that abuts the steering shaft,
wherein the annular two-piece bearing is configured to limit an axial movement of the steering shaft during operation of the vehicle and to permit rotation of the steering shaft.

11. The method of claim 10, wherein the annular two-piece bearing is composed of a combination of nylon and glass fibers.

12. The method of claim 10, wherein the steering shaft has a surface diameter, wherein the upper groove and the lower groove have a groove diameter, and wherein the groove diameter is less than the surface diameter.

13. The method of claim 12, wherein the annular two-piece bearing has an inner diameter based on the upper lip and the lower lip, and wherein the inner diameter of the annular two-piece bearing is less than the surface diameter.

14. The method of claim 13, wherein the inner diameter of the annular two-piece bearing is the same as the groove diameter.

15. The method of claim 14, wherein the upper lip of the annular two-piece bearing interacts with the upper groove of the steering shaft and the lower lip of the annular two-piece bearing interacts with the lower groove of the steering shaft.

16. The method of claim 10, wherein each piece of the annular two-piece bearing includes a male snapping member and a female snapping member, and wherein a male snapping member of a first piece of the annular two-piece bearing mechanically interacts with a female snapping member of a second piece of the annular two-piece bearing.

17. The method of claim 16, wherein a female snapping member of the first piece of the annular two-piece bearing mechanically interacts with a male snapping member of the second piece of the annular two-piece bearing.

18. The method of claim 10, wherein a first radius of curvature of the convex outer surface of the annular two-piece bearing is designed based on a second radius of curvature of the inner wall of the chamber.

* * * * *